(12) United States Patent
Johnson et al.

(10) Patent No.: US 8,843,964 B2
(45) Date of Patent: Sep. 23, 2014

(54) INTERACTIVE MATRIX CELL TRANSFORMATION USER INTERFACE

(75) Inventors: Steven Johnson, Boulder, CO (US); Stephen Glennon, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 13/534,381

(22) Filed: Jun. 27, 2012

(65) Prior Publication Data

US 2014/0007163 A1    Jan. 2, 2014

(51) Int. Cl.
*H04N 5/445* (2011.01)
*H04N 21/462* (2011.01)
*H04N 21/482* (2011.01)
*H04N 21/4722* (2011.01)

(52) U.S. Cl.
CPC .......... *H04N 21/482* (2013.01); *H04N 21/4722* (2013.01); *H04N 21/4622* (2013.01); *H04N 5/44543* (2013.01)
USPC .............................................. 725/43; 725/52

(58) Field of Classification Search
CPC .......... H04N 21/4316; H04N 21/4622; H04N 21/47214; H04N 21/482; H04N 5/44543
USPC ........................................................ 725/43
See application file for complete search history.

(56) References Cited

U.S. PATENT DOCUMENTS

| | | | |
|---|---|---|---|
| 7,373,650 B1 * | 5/2008 | Rodriguez et al. | 725/41 |
| 7,493,639 B2 * | 2/2009 | Lawler et al. | 725/40 |
| 2003/0117427 A1 * | 6/2003 | Haughawout et al. | 345/710 |
| 2005/0108751 A1 * | 5/2005 | Dacosta | 725/39 |
| 2005/0235321 A1 * | 10/2005 | Ahmad-Taylor | 725/56 |
| 2007/0139386 A1 * | 6/2007 | Martin et al. | 345/173 |
| 2007/0165964 A1 * | 7/2007 | Wolf et al. | 382/276 |
| 2008/0165141 A1 * | 7/2008 | Christie | 345/173 |
| 2011/0037851 A1 * | 2/2011 | Kim et al. | 348/143 |
| 2011/0085526 A1 * | 4/2011 | Joseph et al. | 370/338 |
| 2011/0202960 A1 * | 8/2011 | Vaysman et al. | 725/41 |
| 2011/0283189 A1 * | 11/2011 | McCarty | 715/707 |
| 2012/0151525 A1 * | 6/2012 | Demchenko et al. | 725/39 |
| 2012/0278825 A1 * | 11/2012 | Tran et al. | 725/13 |
| 2012/0284753 A1 * | 11/2012 | Roberts et al. | 725/45 |
| 2012/0306929 A1 * | 12/2012 | Chalkov | 345/666 |
| 2012/0311444 A1 * | 12/2012 | Chaudhri | 715/716 |

* cited by examiner

*Primary Examiner* — Nasser Goodarzi
*Assistant Examiner* — Michael B Pierorazio
(74) *Attorney, Agent, or Firm* — Great Lakes Intellectual Property, PLLC

(57) ABSTRACT

An interactive matrix tile transformation user interface is contemplated. The user interface may be configured to facilitate user navigation of a display or other interface through which services may be requested, including facilitating navigation of television related services. The user interface may be operable in a device having capabilities sufficient to control operation of an output device in response to user input.

17 Claims, 8 Drawing Sheets

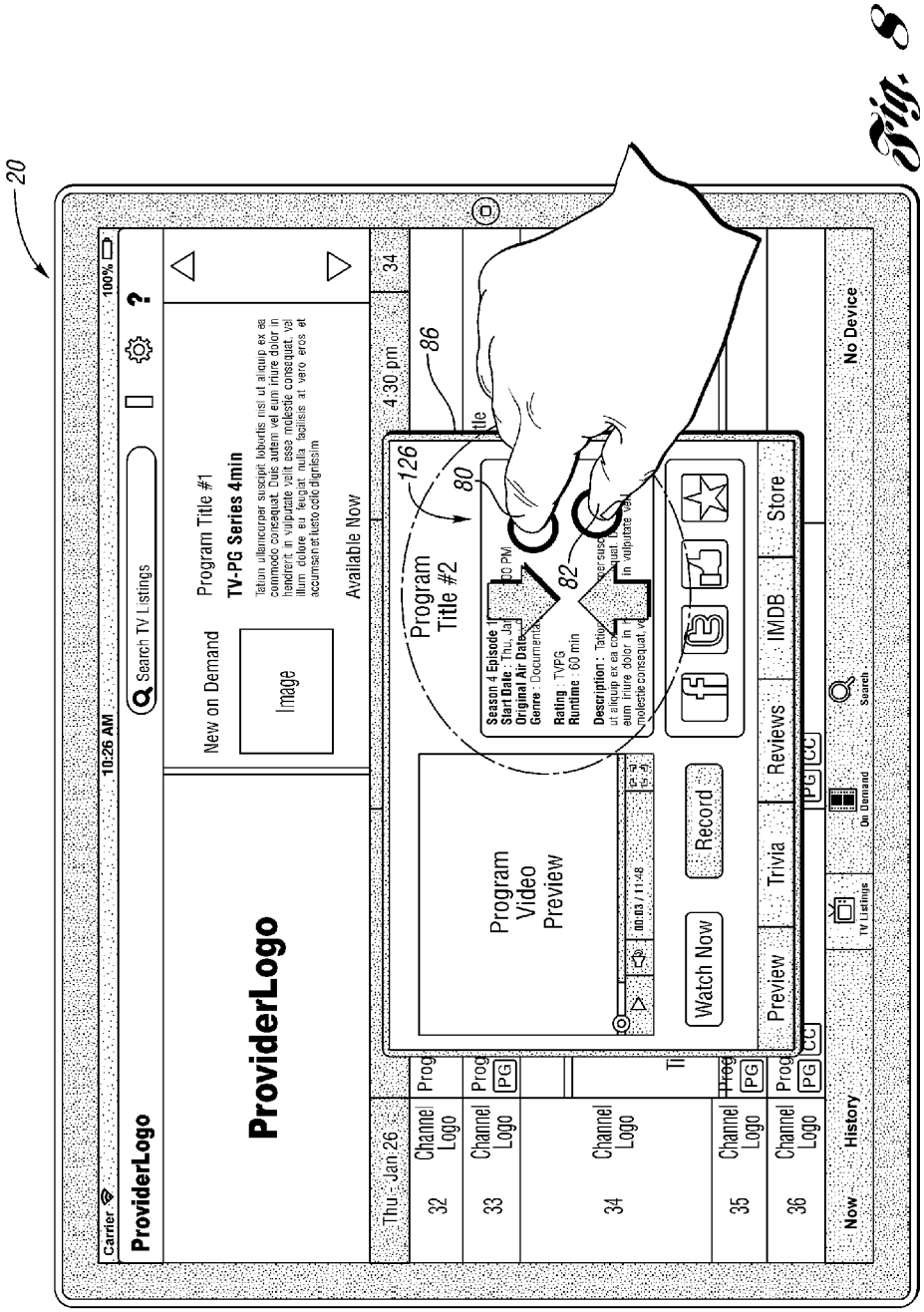

INTERACTIVE MATRIX CELL TRANSFORMATION USER INTERFACE

TECHNICAL FIELD

The present invention relates to user interfaces, such as but not necessarily limited to graphical user interfaces or other electronically displayable user interfaces.

BACKGROUND

FIG. 1 illustrates a traditional electronic programming guide (EPG) for use in selecting a television program for viewing. The EPG is characterized as a grid guide since it includes a plurality of cells 12 arranged according to channel number, viewing time, and program title. A user may change the displayed program titles by adjusting one of the channel number and the viewing time. This type of grid guide configured EPG maintains the illustrated appearance throughout operation in that each of the tiles display basically the same type of information regardless of the channel numbers and/or viewing times being displayed. A top portion of the EPG may provide additional information beyond that shown in a lower, grid guide portion, such as by displaying additional information for a selected one of the tiles. While it may be helpful to provide the additional information within the top portion, the EPG is somewhat limited to providing additional information for only a single one of the program titles. It may be desirable to provide a better expanded view of additional information for more than one of the program titles.

BRIEF DESCRIPTION OF THE DRAWINGS

FIG. 8 illustrates a pinching-user input in accordance with one non-limiting aspect of the present invention

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
FIG. 1 illustrates a traditional electronic programming guide (EPG) 10 for use in selecting a television program for viewing.
Figure 2:
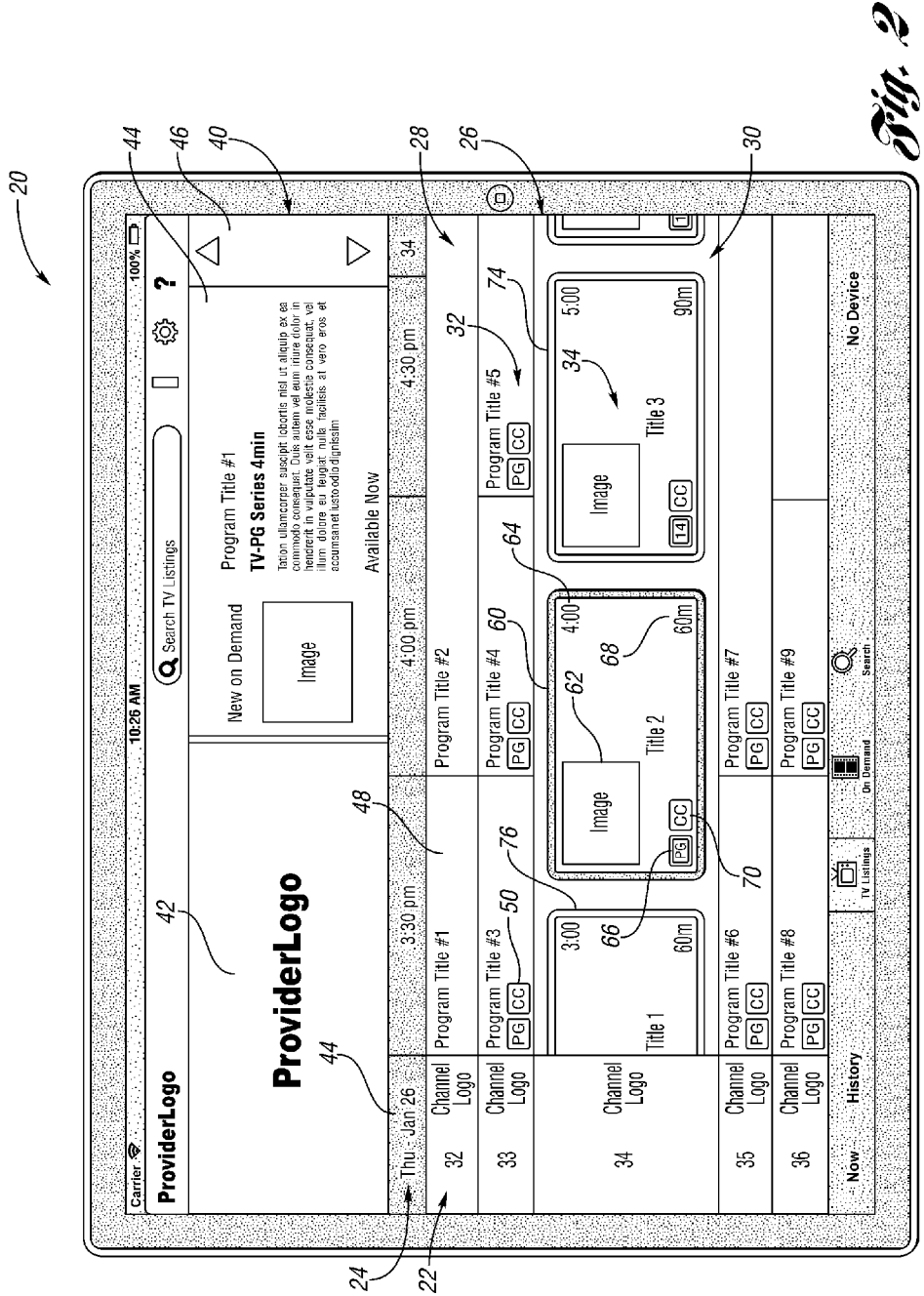
FIG. 2 illustrates a user interface in accordance with one non-limiting aspect of the present invention.

FIG. 2 illustrates a user interface 20 associated with U.S. patent application Ser. No. 13/458,276, the disclosure of which is hereby incorporated by reference in its entirety team. The user interface 20 is shown to be configured to facilitate selecting a television program, or more particularly a title associated with a television program. The television program may be selected according to a channel number 22 and a viewing time 24. The channel number 22 may represent a signaling stream or other electronic medium used to transmit the corresponding television program. The viewing time 24 may relate to a given period of time or other scalable marker sufficient to designate transmission of a television program. The use of the user interface 20 is predominately described with respect to this television-based implementation; however, the present invention fully contemplates the user interface 20 being sufficient to facilitate selection of any type of content and not just television related content. The user interface 20, in particular, may be beneficial to facilitate selecting any type of electronically transmissible content where transmission occurs as a combination of signal addressing (e.g., channel number) and program scheduling (e.g., viewing time).

The user interface 20 is shown to be displayed within a display of a tablet computer. The display may be a touch-screen type of display where a user is able to perform manipulations to the user interface 20 with their finger or with pointer based movements. The user interface 20 may be graphically represented according to rendering instructions stored from a non-transitory computer-readable medium associated with the tablet. The computer-readable medium may include computer-readable code embodied therein for controlling the tablet to electronically facilitate selection of a television program or otherwise facilitate access to services in a manner contemplated by the present invention. The user interface 20 may be any type of graphical user interface (GUI), human-computer interface (HCI), and/or man-machine interface (MMI). The user interface 20 need not necessarily be rendered through the tablet computer. In particular, the present invention fully contemplates the use of the user interface 20 with a set top box (STB), a television, or other type of display with which a user desiring to access or otherwise select content may interact. The tablet is noted as one non-limiting aspect of the present invention leveraging off of wireless communication capabilities of the tablet to direct or instigate subsequent controls according to the selected television program.

The tablet, for example, may be particularly beneficial in facilitating remote control of a STB, a digital video recorder (DVR), personal video recorder (PVR), a television, a mobile/cellular phone, a voice over Internet protocol (VoIP) device, etc. The tablet itself could be a consumption device such that the navigation is to find content to view on the tablet. The user interface may be configured in the illustrated manner to facilitate implementing any number of television-based controls, such as but not limited to changing a channel of a television, setting a recording, and/or reviewing programming related information (e.g., parental ratings, synopsis, duration/running time, start time, and time, closed-captioned capabilities, clips, images, trailers, contact information, advertisements, usage rates, high definition capabilities, 3-D capabilities, etc.). The use of the tablet may be particularly beneficial with providing the contemplated remote control since the signals commanding the desired action may be issued from the tablet over a wireless network, a cellular network, or the like for receipt by the to be controlled device and/or a system operator or multiple system operator (MSO) associated with the to be controlled device or otherwise related to facilitating transmission of the selected television program.

The user interface 20 is shown to include a tiled portion 26 having a grid portion 28 and a reading lens portion 30. The grid portion 28 and the reading lens portion 30 may be arranged relative to the channel number column 22 and the viewing time row 24 to facilitate identifying television program titles according to the time of day and the channel carrying the corresponding television program. Program information 32, 34 shown within the tiled portion 28 and the reading lens portion 30 may be changed with a scrolling operation where a user selects a portion of the tiled portion 28 or the reading lens portion 30 and therefrom drags a finger in a certain direction. This directional dragging may be used to control the speed and direction with which the television program information may change. A vertical type of directional dragging may be used to actuate the displayed channel members 22 in an upward or downward fashion to facilitate displaying different channel members. A horizontal type of directional dragging may be used to actuate the displayed viewing times 24 in a forward or backward fashion to facilitate displaying different viewing times. This directional dragging may be used to control the displayed program information 32, 34 so that a user can easily locate television programs desired for selection, i.e., to facilitate inputting a related control command for the selected television program.

The user interface 20 is shown to include a top portion 40, which also may be considered as part of the tiled portion 26, having a first window 42 for displaying additional information for a selected one of television program titles, such as to display an image representative of the corresponding television program, a synopsis of the program, and additional related information. A second window 44 may be included in the top portion to facilitate advertisements or display of other information that may not necessarily be attending to a selected one of the displayed television program titles. A third window 46 may be included in the top portion to facilitate input of a particular television channel number to be selected for quickly changing the television channel currently being up by a television, such as by directly inputting the number upon selection of the third window 46 (a keyboard may be displayed with the selection) and/or with use of corresponding directional arrows where the channel number showing at the time of ceasing actuation of one of the directional arrows is automatically tuned to by the television. A current date may be shown within a fourth window 48 proximate the channel numbers 22 and viewing times 24 to facilitate notifying a user of the date to which the currently displayed viewing times and channel numbers relate. The user interface 20 is shown to be configured in this manner for exemplary non-limiting purposes as the present invention fully contemplates user interface 20 being configured to facilitate displaying various types of information in addition to or place of that which is illustrated.

The grid portion 28 may be comprised of a plurality of tiles 48 (only one labeled) where each grid tile displays the television program title and a minor graphical indicator 50, such as the illustrated close captioning indicator. The tiles 48 may have the same height and different widths that approximate a remaining running time of the corresponding television program. The tiles 48 may be considered to be arranged in a linear manner since the width of each grid cell is set to correspond with a first timeline associated with the viewing times 24. The first timeline is shown to correspond with a range of half hour increments beginning with 3:30 PM and ending at 4:30 PM. The reading lens portion may be comprised of a plurality of reading lens cells 60 where each reading lens cell 60 displays additional information beyond that which would be displayed the same television program within the grid portion 28. This expanded view of the related program information 34 may be used, for example, to additionally display an image 62, a start time 64, a rating 66, a remaining running length 68, and/or a closed captioning 70 associated with the corresponding television program. The reading lens cells 60 may be configured to be of the same height and width, regardless of the duration of the corresponding television program. (One of the reading lens cells is shown to be cropped; however, it will have the same size as the other two illustrated the reading lens cells once scrolled leftwardly.)

The reading lens cells 60 may be considered to be organized in a non-linear manner since the width of each cell is not proportional to a remaining running length of the corresponding television program. As shown, one of the reading lens cells 60 corresponding with the program having remaining running time of 60 minutes is shown to have the same width as the following television program having a remaining running time of 90 minutes. This sizing commonality of the reading lens cells 60, and particularly that the cells 60 provide an expanded view and/or additional information for the related television program, is believed to be beneficial in allowing a user to see the upcoming division program titles without having to actuate the first timeline (e.g., viewing time 24) to a viewing time corresponding with the program. The first reading lens grid cell 60 is associated with a program having a remaining running length of 60 minutes and the second reading lens grid cell 74 is associated with a program having remaining running length of 90 minutes. These two programs 60, 74 have a combined remaining running time of two half hours, which is exceeds the viewing time shown within the first timeline, effectively providing a second timeline. When coupled with additional reading lens cells 76, the reading lens portion 30 is able to visually display the closest three programs corresponding with the currently selected range of channel numbers and viewing times.

The ability to present the three programs in the reading lens portion 30 may be beneficial in allowing a user to quickly reference the three programs 60, 74, 76 without having to perform a scrolling operation or otherwise manipulate the user interface 70 beyond the current timing increments of the first timeline corresponding with the grid portion 28. While three reading lens cells 60, 74, 76 are shown, the present invention fully contemplates the use of any number of reading lens cells 60, 74, 76 and is not necessarily limited to the use of three. Optionally, the number of displayed reading lens cells 60, 74, 76 may be selected by the user or set according to a desired profile created for the user. While the reading lens portion 30 is shown to be horizontally orientated in a parallel manner to the first timeline, the present invention fully contemplates arranging the reading lens portion 30 with other orientations. The reading lens portion 30 may, for example, be vertically orientated relative to an outer side of the display, i.e., rightward of the last viewing time, such that the three upcoming programs 60, 74, 76 are vertically shown, optionally with the same height and width as illustrated, e.g., by stacking the three reading lens cells 60, 74, 76 at top of each other. The corresponding channel number may retain the appearance it would present if shown within the tiled portion 28, optionally with an arrow or other indicator to show his relation to the vertically orientated reading lens portion. Of course, this is one exemplary alternative to the illustrated configuration the present invention fully contemplates the use of other reading lens configurations.

The illustrated reading lens configuration is believed to be beneficial in providing a reading lens type of expanded view of contents will therethrough. The reading lens portion 30 is shown to be anchored approximate a middle of the channel numbers 22 to present this reading lens type of experience. Of course, the reading lens portion 30 can be shifted upwardly and downwardly relative to this central position as desired, such as in response to receiving a request from a user of information included within the user profile. The reading lens portion 30 and the tiled portion 28 may be similarly responsive to the directional dragging of a finger or other pointer in order to change the displayed program information 32, 34 in one or both of the tiled portion 28 and the reading lens portion 30. One non-limiting aspect of the present invention contemplates controlling an acceleration at which the displayed program information 32, 34 is changed according to how quickly the directional dragging takes place and/or as a function of a distance of which the directional dragging takes place across the display.

The tiles comprising the tiled portion 26 and/or the top portion 40 may be highlighted or otherwise selected with user input. The user input may be determined by the tablet from movement of users' fingers across the touch-screen and/or from operation of a device, such as but not necessarily limited to a mouse or remote control. FIG. 2 illustrates reading cell 60 being highlighted. The highlighting may be noted with and accentuation or other illustration of a band around a boundary of the cell 60. A similar type of highlighting may occur with one of the other tiles of the grid portion 28 and the reading lens portion 30 and/or the windows 42, 44 of the top portion 40. Once highlighted, a single-point touch may be made by the user to the touch-screen to indicate further selection of the highlighted tile. This may cause the tablet to command the output device to access the corresponding television program or to perform some other operation associated with the highlighted tile, e.g., instigating a recording, requesting further information, transmitting a message to a friend, displaying additional advertising formation, etc. The ability to send user input may be beneficial in allowing the user to easily navigate the user interface 20 and to facilitate selecting desired tiles for corresponding action.

Figure 3:
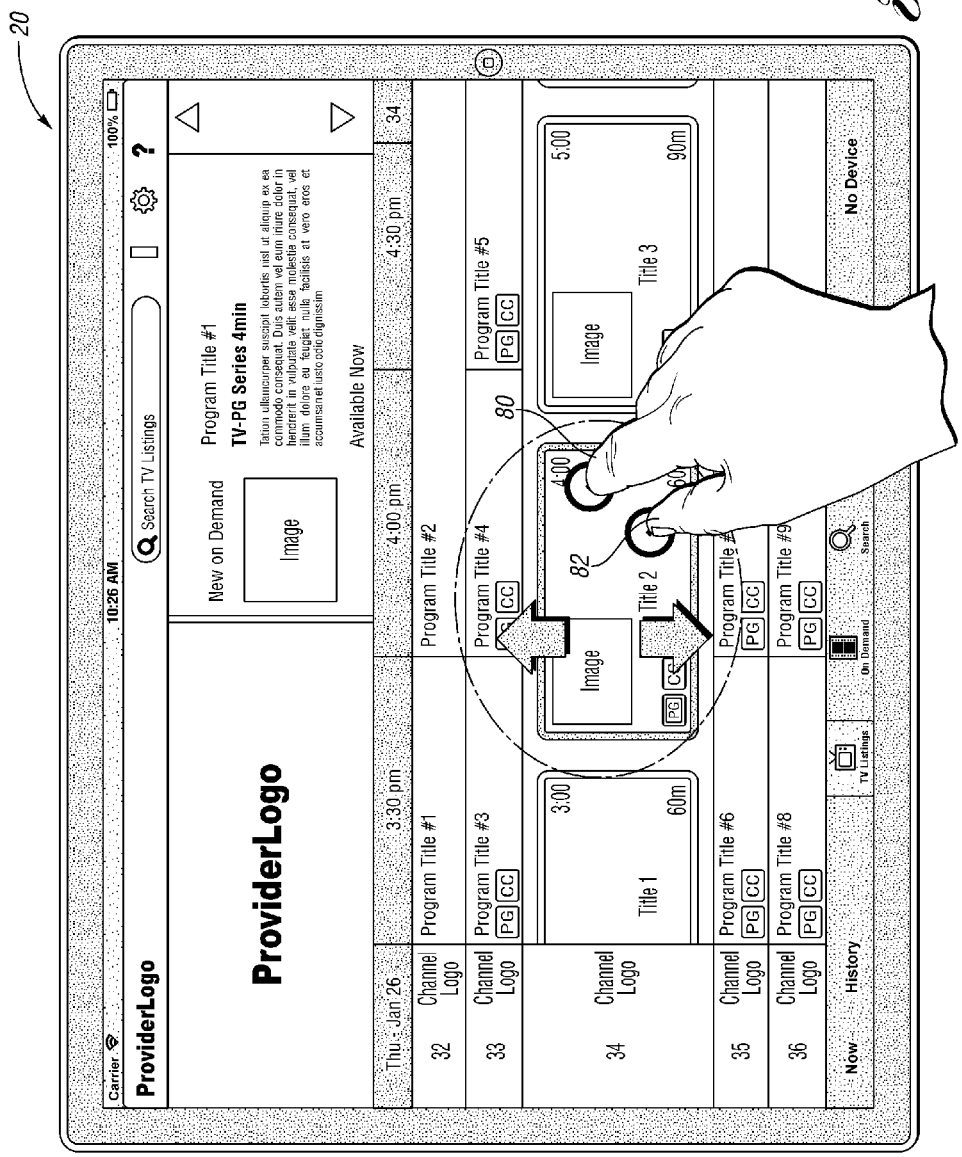
FIG. 3 illustrates detection of a multi-point user input in accordance with one non-limiting aspect of the present invention.

FIG. 3 illustrates detection of a multi-point user input in accordance with one non-limiting aspect of the present invention. The multi-point input may correspond with a first and second finger 80, 82 of the user performing a multi-point operation where the first and second fingers 80, 82 are positioned within a boundary of the reading lens cell 60 and thereafter expanded to create a greater distance between themselves. Optionally, instead of relying upon user to spread their first and second fingers 80, 82, the mouse or remote control may include a zoom button or other feature sufficient to facilitate detecting a desire to communicate such a multi-point input. The multi-put input shown to occur within the boundary of the reading lens cell 60, however, a similar type of operation may occur proximate into the reading lens cell 60 and/or relative to one of the other tiles. The boundary of the tile within which the zoom action is detected and/or the tile closest to the zoom action may be used as a reference to facilitate displaying an exploded tile in a manner contemplated by one non-limiting aspect of the present invention.

Figure 4:
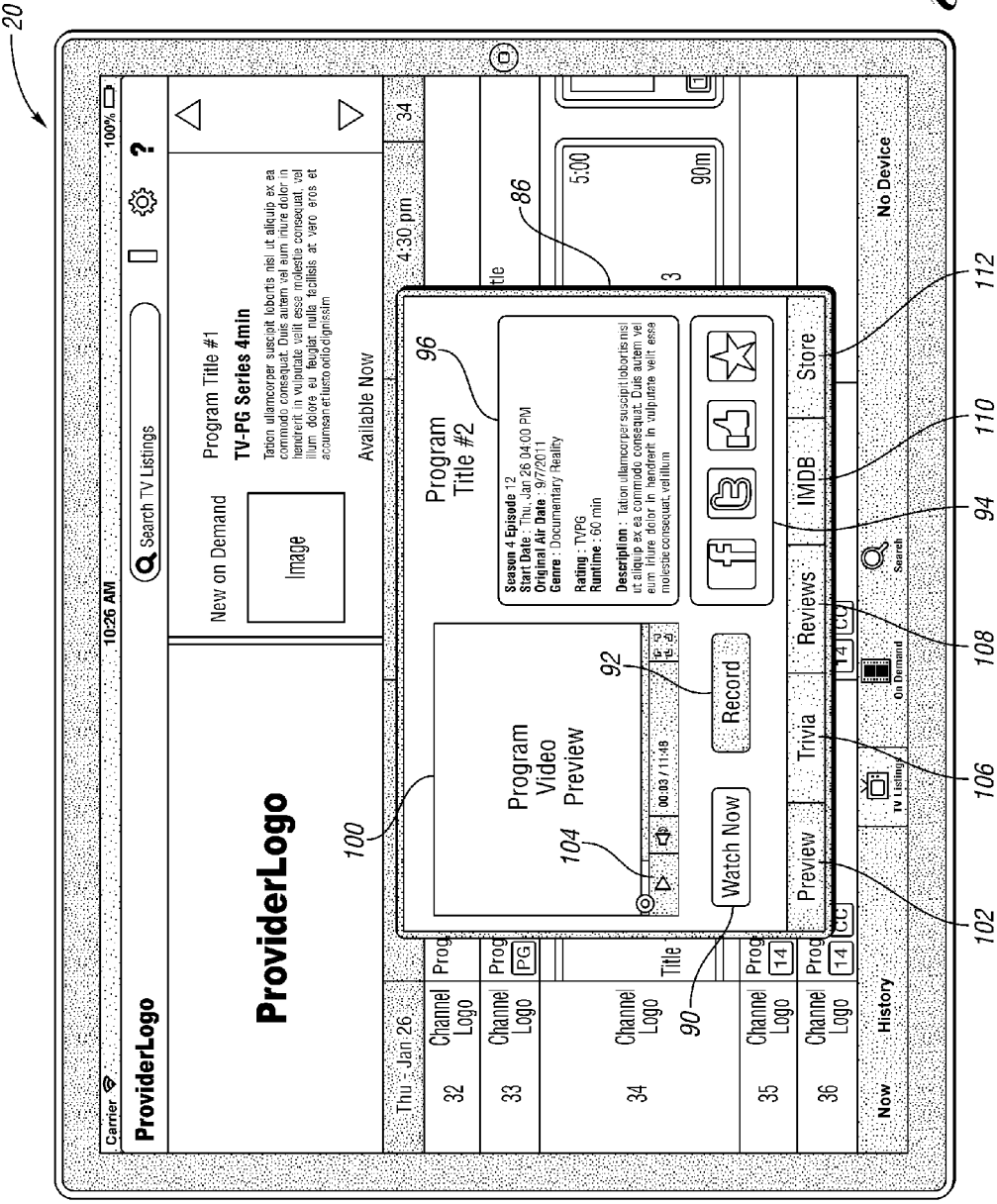
FIG. 4 illustrates an exploded tile in accordance with one non-limiting aspect of the present invention.

FIG. 4 illustrates an exploded tile 86 in accordance with one non-limiting aspect of the present invention. The exploded tile 86 is shown to appear over at least part of the tiled portion 26 and to include additional information, referred to as exploded information, beyond that displayed within the tiled portion 26 for the same tile 60. The exploded information may be useful in providing additional details regarding the corresponding television program and/or capabilities of the tablet and/or output device to execute related operations. This may include displaying a tuning button 90 or a recording button 92 to facilitate directing the output device to tune to the corresponding television program and/or to facilitate recording of the television program with the output device or another recording device. Additional operations may include capabilities to post to third-party applications 94, such as Facebook and Twitter, and/or to note the program as being a liked or added to a list of favorites. Optionally, one or more of the operations may relate to wireless networking operations where the tablet is controlled to transmit corresponding messages over home wireless network or other communication medium, which may be distinct from a communication medium used to control the output device (e.g., the tablet may be configured to engage directly with output device through infrared, Bluetooth or other direct signaling).

The exploded information may also include a details window 96 in which additional detail regarding the television program may be shown. The additional detail may include season information, a start date, and original air date, a genre, a rating, a runtime, and a synopsis or description. A title of the television program and/or a particular title of the episode may be shown above the details window 96. A preview window 100 may be included to facilitate a preview. The preview window 100 may initially display a static image representative of the television program. A preview button 102 or a play button 104 may be included to respectively instigate display of the preview window and begin playback of the preview. The preview may playback within the preview window 100, such as to display a short clip representative of the television program. Additional features may performing operations associated with a trivia button, a reviews button, and iMDB button, and a store button. The trivia button 106 may be selected to display trivia regarding the television program, the review button 108 may be selected to display reviews submitted by other viewers of the television program, the iMDb button 110 may be used to navigate to additional information about the program provided by a third party data provider like IMDb, and the store 112 but may be used to access an online store where items relating to the television program may be purchased.

Figure 5:
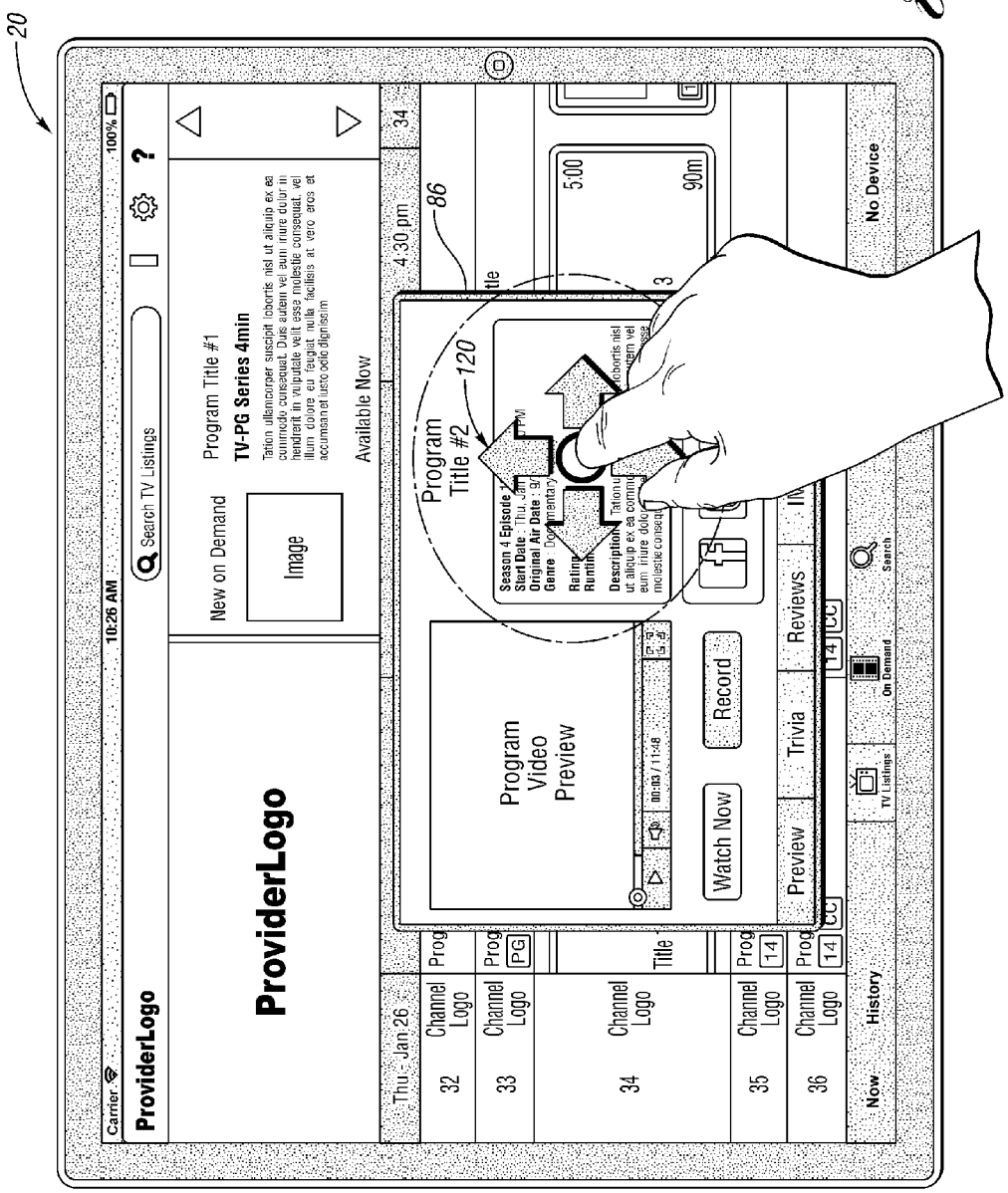
FIG. 5 illustrates a navigation controller in accordance with one non-limiting aspect of the present invention.
Figure 6:
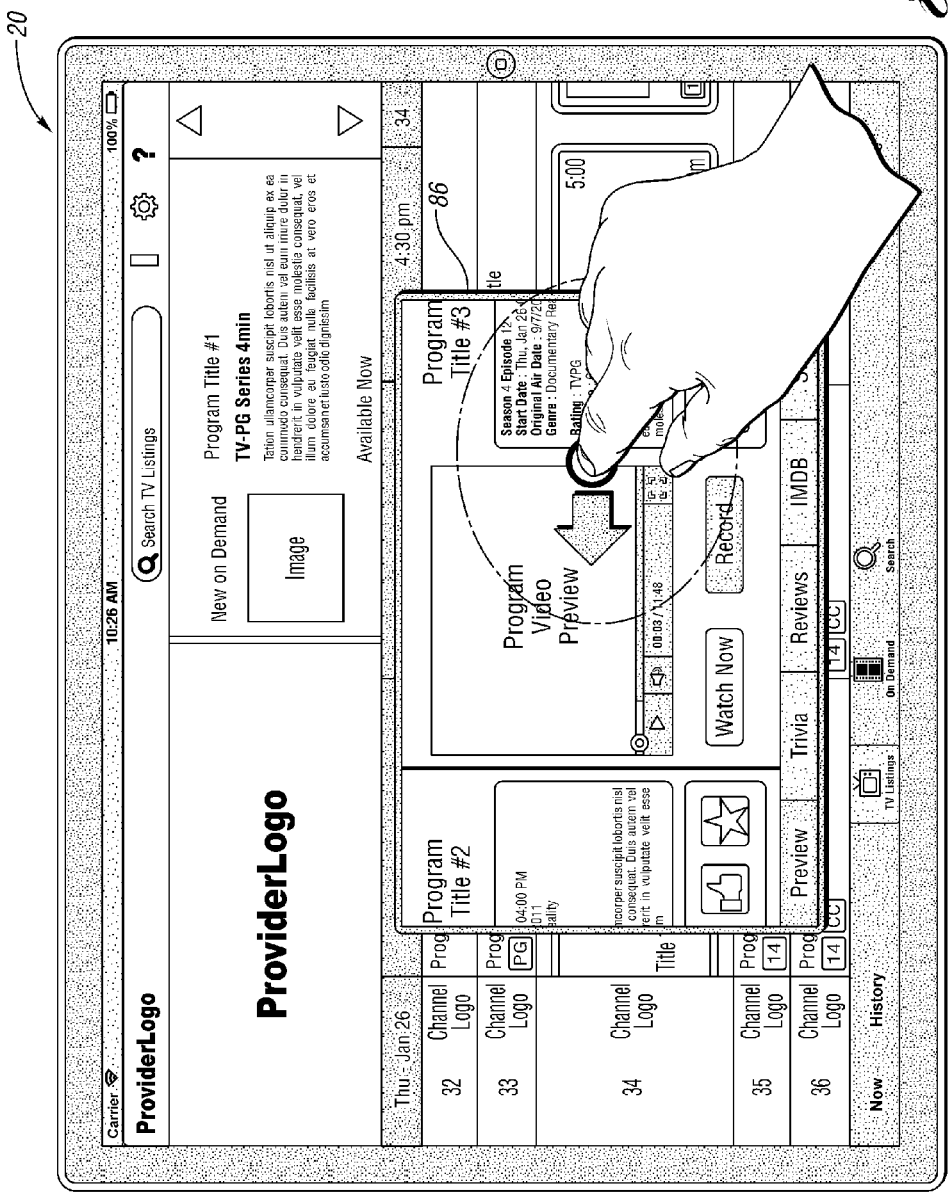
FIG. 6 illustrates a scrolling of the exploded information in accordance with one non-limiting aspect of the present invention.

FIG. 5 illustrates a navigation controller 120 in accordance with one non-limiting aspect of the present invention. The navigation controller 120 may be associated with the exploded tile 86 and operable in response to user input to facilitate changing the exploded information. The exploded information shown to include information associated with the highlighted tile 60. This information may be changed to convey exploded information for an adjoining tile, i.e. the tile immediately leftward, rightward, upward, downward from the highlighted tile. FIG. 6 illustrates a scrolling of the exploded information in accordance with one non-limiting aspect of the present invention. The scrolling may correspond with a leftward movement corresponding with a directional dragging of the user's finger from an area within the exploded tile 86 toward a leftward direction. This leftward movement may cause the exploded information associated with the highlighted cell 60 to start moving leftward may toward a left edge of the exploded tile 86 while information associated with a rightward tile 74 begins to slide into the exploded tile from a rightward edge. This type scrolling may be beneficial in allowing the user to easily navigate to an adjoining tile without having to close the exploded tile 86, thereby allowing the user to easily gain the additional functionality associated with the exploded tile 86.

The tiled portion 26 is shown to appear behind below the exploded tile 86. The tiled portion 26 may be considered to be within a first plane and the exploded tile 86 may be considered to be within a second plane wherein the second plane appears in front of the first plane. The second plane may be used to offset the exploded tile 86 from the tiled portion 26, such as to provide a pop-up appearance. The tiled portion 26 may be partially viewable behind or around the exploded tile 86, optionally it may be darkened or otherwise adjusted in order to enhance the preeminence of the exploded tile 86. The tiled portion 26 may scroll with scrolling of the exploded information such that the information shown within the tiled portion 26 changes in proportion to the changes within the exploded tile 86. This may include, changing a timeline shown in the top of the tiled portion 26 to correspond with a change in timeline of the exploded tile 86, which may correspond with changing a beginning of the timeline by an interval approximate equal to a running length of the television program being scrolled out of the exploded tile 86. While the scrolling shown to occur in an x-direction, a similar type scrolling may occur in a y-direction. The y-direction, however, may correspond with changing not only the television program within the exploded tile 86 but also the television channel to which it corresponds, i.e., a next lower channel would be displayed with a directional dragging having an upward movement and a next higher channel would be displayed with a directional dragging having a downward movement.

The directional dragging used to facilitate the scrolling may be considered to be a single-point input where a user presses a single finger against the touch-screen and then begins to drag it in a direction. While FIG. 5 illustrates the navigation controller, the controller may not be visible to the user. The directional dragging and/or scrolling may be accomplished automatically upon the tablet detecting the single input touching and subsequent dragging prior to the finger being removed. In the event the finger is not dragged once the screen is touched, i.e., remains a stationary position or corresponds with a tap, the tablet may assess an area proximate the corresponding touch location for an actuatable button or input. The tablet may be configured to execute an operation associated with a button positioned proximate a touch or touching location, assuming the touching location is within a predefined distance relative to a center of the button. This can be beneficial in allowing a user to facilitate execution of various operations without having to close the exploded tile 86 and/or without having to divert their attention to another portion of the user interface or buttons on a mouse or remote control.

Figure 7:
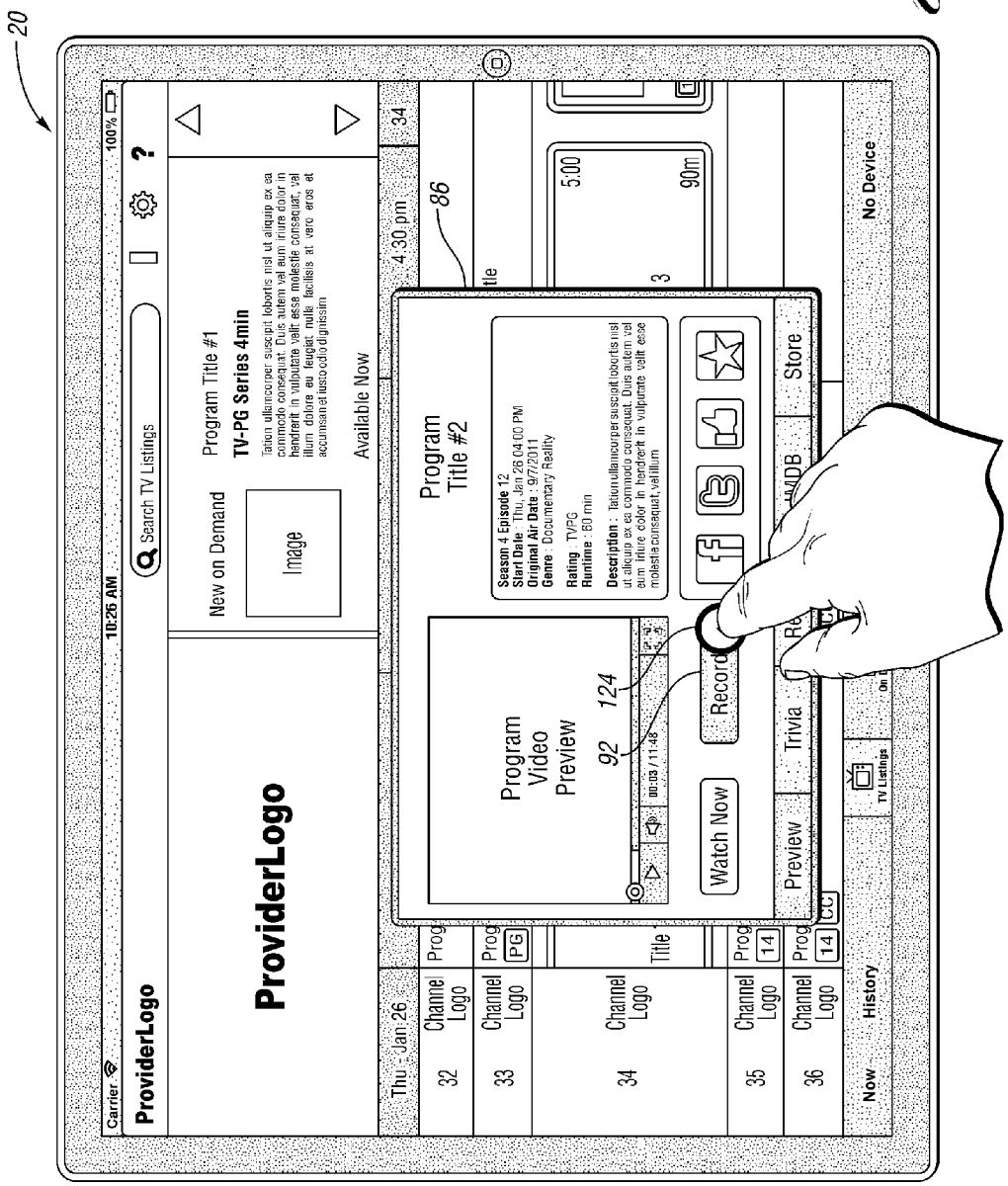
FIG. 7 illustrates a touch in accordance with one non-limiting aspect of the present invention

FIG. 7 illustrates a touch 124 in accordance with one non-limiting aspect of the present invention. The touch 124 is shown to correspond with a user desiring to actuate the record button 92 in order to instigate a recording of the television program shown within the exploded tile. The tablet may include a timer or other clocking typed device to assess whether the touch has occurred for a sufficient period of time to instigate the corresponding operation or to differentiate it from a directional dragging type of movement. The user may continue navigating through the available services with additional scrolling operations, e.g., after selecting one program for recording the user may then perform a scrolling operation in order to select another program for viewing, recording, favoriting, etc. The user may cease navigation through the exploded tile by having it removed with a corresponding user input. FIG. 8 illustrates a pinching user input 126 sufficient to remove the exploded tile in accordance with one non-limiting aspect of the present invention. The pinching user input may correspond with a multi-point input where the first and second fingers 80, 82 of the user move together after touching the screen to communicate a desire to close the exploded tile 86. The exploded tile may also be removed with a single-point input where the user touches a portion of the screen outside the boundary of the exploded tile 86.

As supported above, one non-limiting aspect of the present invention provides for the transformation of, via a user gesture such as a pinch-zoom, a static data presentation tile in a matrix into an interactive panel, while preserving the ability to navigate the x and y axis of the underlying matrix. This capability may be used to facilitate identifying content for viewing as well as for other applications, such as in a wider realm than the grid guide navigation where a general "transformed magnification paradigm" could be used to facilitate navigating documents, text or other electronically displayable media, e.g., using the exploded view, the text might be magnified, but also contain additional information (such as the footnotes appearing between the "magnified" lines of the text). While the present invention fully contemplates a tile matrix viewer, such as a television grid guide or electronic programming guide (EPG) that provides the ability to scroll through channels and time (x,y), but that does not provide interactive function, it is believed the interactive function of the exploded tile may be more appealing to users. One non-limiting aspect of the present invention provides for both increased scope of presentation data and the ability to interact with this data. In contrast to a simple popover, which is contemplated, the contemplated transformed control also provides for horizontal and vertical scrolling to and from adjacent tiles in transform view and the underlying matrix.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having instructions operable to execute on a mobile device to provide a graphical user interface to facilitate issuance of wireless command signals from the mobile device to an output device, the output device being configured to tune to a selected television channel in response receipt of a corresponding wireless command signal from the mobile device, the non-transitory computer-readable medium comprising instruction for:

graphically representing television programs associated with the television channels within a tiled portion of the graphical user interface, the tiled portion including a plurality of tiles for graphically representing the television programs, including graphically representing the tiled portion to include a grid portion and a reading lens portion, the grid portion graphically representing television programs associated with a first portion of the television channels, the reading lens portion graphically representing television programs associated with a second portion of the television channels, the first portion of the television programs being different than the second portion of the television programs;

graphically representing an exploded tile associated with a user selected first tile of the plurality of tiles represented within one of the grid portion and the reading lens portion, the exploded tile appearing over at least a first part of the tiled portion, the exploded tile blocking the first part from view, the exploded tile including additional information beyond that displayed within the tiled portion, referred to as exploded information;

graphically representing a preview button within the exploded tile;

graphically representing a preview window within the exploded tile; and displaying a preview of the television program associated with the exploded tile within the preview window upon user selection of the preview button.

2. The non-transitory computer-readable medium of claim 1 further comprising instructions for:

graphically representing the exploded tile to include a navigation controller, the navigation controller being operable in response to user input to change the exploded information from that associated with the first tile to that associated with a second tile, the exploded information changing without requiring user selection of the second tile from the tiled portion, the second tile being one of the plurality of tiles; and determining the second tile as a function of user movement of the navigation controller.

3. The non-transitory computer-readable medium of claim 2 further comprising instructions for:

determining a direction of the user movement; and determining the second tile to be the one of the plurality of tiles that is next to the first tile in one of a leftward direction, an upward direction, a rightward direction and a downward direction corresponding with the direction of the user movement.

4. The non-transitory computer-readable medium of claim 1 further comprising instructions for:

graphically representing a channel selection button within the exploded tile; and commanding the output device to tune to the television program associated with the second tile upon user selection of the channel selection button.

5. The non-transitory computer-readable medium of claim 1 further comprising instructions for:

graphically representing a record button within the exploded tile; and commanding the output device to record the television program associated with the second tile upon user selection of the record button.

6. The non-transitory computer-readable medium of claim 1 further comprising instructions for displaying a static preview image associated with the preview within the preview window prior to user selection of the preview button.

7. The non-transitory computer-readable medium of claim 1 further comprising instructions for:

graphically representing the tiled portion below a top portion, the top portion including a plurality of windows for graphically representing additional information relating to the television programs; and graphically representing the exploded tile entirely below the top portion and such that an upper boundary of the exploded tile at least partially blocks a timeline of the tiled portion from view.

8. The non-transitory computer-readable medium of claim 1 further comprising instructions for performing a scrolling of television programs graphically represented within the tiled portion in response to a directional dragging, the scrolling appearing behind the exploded tile within the tiled portion not covered with the exploded tile.

9. The non-transitory computer-readable medium of claim 8 further comprising instructions for changing a timeline of the television programs shown in the tiled portion during the scrolling by an interval at least equal to a running length of the television program associated with the first tile when the running length is greater than a time increment used within the timeline.

10. The non-transitory computer-readable medium of claim 1 further comprising instructions for:

graphically representing the first portion of the television channels according to a linear increment of time and the second portion of the television channels according to a non-linear increment of time; and limiting display of the exploded tile to tiles selected from within the reading lens portion, thereby requiring navigation of tiles within the grid portion to the reading lens portion before the exploded view can be displayed for those tiles.

11. The non-transitory computer-readable medium of claim 10 further comprising instructions for:

graphically representing each of the television programs within the grid portion within a separate grid tile, each grid tile being displayed with a first height; and graphically representing each of the television programs within the reading lens portion within a separate reading lens tile, each reading lens tile being displayed with a second height, the second height being greater than the first height and less than a third height of the exploded tile such that each reading lens tile provides an expanded view, the expanded view including more information than that which is shown in the grid tiles and less information than which is shown in the exploded tile.

12. The non-transitory computer-readable medium of claim 11 further comprising instructions for:

graphically representing each grid tile with a width proportional to a running length of the corresponding television program; and graphically representing each reading lens tile with a same width regardless of the running length of the corresponding television program.

13. A method of facilitating selection of television services comprising:

graphically representing television services available for selection within a tiled portion of a user interface, the tiled portion comprising a plurality of tiles each configured to graphically depict information for a corresponding television service within a first plane adjoining to a timeline appearing along one edge of the tiled portion;

graphically representing an exploded tile associated with a user selected first tile of the plurality of tiles, the exploded tile including exploded information for the television service corresponding with the first tile, the exploded information including information beyond that displayed within the tiled portion for the first tile, the exploded tile graphically depicting the exploded information within a second plane appearing above at least part of the tiled portion appearing within the first plane; and graphically representing a top portion such that a bottom edge of the top portion abuts a top edge of the timeline, the exploded tile obstructing at least a portion of the timeline and no portion of the top portion, the top portion being within the first plane and including a plurality of windows for graphically representing additional information relating to the television programs;

graphically representing a preview button within the exploded tile;

graphically representing a preview window within the exploded tile; and displaying a preview of the television program associated with the exploded tile within the preview window upon user selection of the preview button.

14. The method of claim 13 further comprising:
performing a scrolling of the exploded information from that correspond with the first tile to the that corresponding with a second tile, the second tile corresponding with one of the plurality of tiles adjoining the first tile within the tiled portion, the scrolling being performed while displaying the exploded tile within the second plane; and
blocking a first part of the tiled portion with the exploded tile to prevent viewing of the first part and to cause the second plane to appear closer to the user than the first plane.

15. The method of claim 13 wherein the television services relate to television programs available on one or more television channels and wherein the method further comprises:
graphically representing the tiled portion to include a grid portion and a reading lens portion, the grid portion graphically representing television programs associated with a first portion of the television channels, the reading lens portion graphically representing television programs associated with a second portion of the television channels, the first portion of the television programs being different than the second portion of the television programs;
graphically representing each of the television programs within the grid portion within a separate grid tile, each grid tile being displayed with a first height;
graphically representing each of the television programs within the reading lens portion within a separate reading lens tile, each reading lens tile being displayed with a second height, the second height being greater than the first height;
graphically representing each grid tile with a width proportional to a running length of the corresponding television program; and
graphically representing each reading lens tile with a same width regardless of the running length of the corresponding television program.

16. A non-transitory computer-readable medium having computer-readable code embodied therein for controlling a computing device to electronically facilitate selection of a television program, the computing device being associated with a display, the computer-readable code comprising instructions for:
displaying a selectable plurality of tiles within a tiled portion the display, each of the tiles graphically representing television program information for a corresponding television program, each tile being associated with a different television program and having a boundary;
highlighting a highlighted tile of the plurality of tiles in response to a first user input;
directing an output device to access the television program associated with the highlighted tile in response to a second user input within the boundary of the highlighted tile, the second user input being a single-point input;
displaying an exploded tile for the television program associated with the highlighted tile in response to a third user input within the boundary of the highlighted tile, the third user input being a multiple-point input within the boundary of the highlighted tile, the exploded tile including exploded information for the television program corresponding with the highlighted tile, the exploded information including information beyond that displayed within the highlighted tile, the exploded tile appearing closer to a user than the tiled portion and as a pop-up in front of the highlighted tile such that the exploded tile obstructs the highlighted tile from view;
detecting a fourth user input within a boundary of the exploded tile to be one of a directional dragging and a touch;
if the fourth user input is the directional dragging, scrolling the exploded information from that correspond with the highlighted tile to the that corresponding with an adjoining tile, the adjoining tile corresponding with one of the plurality of tiles adjoining the highlighted tile within the tiled portion, including selecting the adjoining tile to correspond with a direction of the directional dragging; and
if the fourth user input is the touch, directing the output device to one of tune to and record the television program associated with the highlighted tile depending on whether the touch corresponds with a tuning button or a recording button displayed within the exploded tile
detecting a fifth user input while the exploded tile is displayed to be one of a pinch within a boundary of the exploded tile and a touch beyond the boundary of the exploded tile;
if the fifth user input is the pinch within the boundary of the exploded tile, closing the exploded tile;
if the fifth user input is the touch beyond the boundary the exploded tile, closing the exploded tile;
graphically representing the tiled portion to include a grid portion and a reading lens portion, the grid portion graphically representing a first portion of the television programs and the reading lens portion graphically representing a second portion of the television programs, the first portion of the television programs being different than the second portion of the television programs;
graphically representing each of the television programs within the grid portion within a separate grid tile, each grid tile being displayed with a first height;
graphically representing each of the television programs within the reading lens portion within a separate reading lens tile, each reading lens tile being displayed with a second height, the second height being greater than the first height and less than a third height of exploded tile;
graphically representing each grid tile with a width proportional to a running length of the corresponding television program; and
graphically representing each reading lens tile with a same width regardless of the running length of the corresponding television program.

17. The non-transitory computer-readable medium of claim 16 further comprising instructions for:
graphically representing the tiled portion below a top portion, the top portion including a plurality of windows for graphically representing additional information relating to the television programs;
graphically representing the tiled portion and the top portion within a first plane and the exploded tile within a second plane, the second plane at least partially appearing above the first plane such that the second plane, and thereby the exploded tile, appears closer to the user than the first plane; and
enhancing preeminence of the exploded tile by darkening appearance of the tiled portion and the top portion within the first plane.

* * * * *